March 19, 1957 — A. DOLAN — 2,785,881
FAUCET ATTACHMENT
Filed July 26, 1954
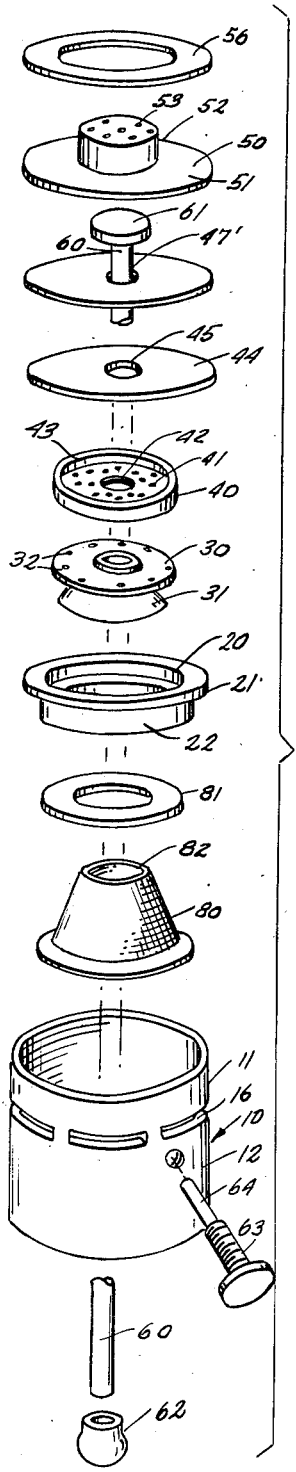
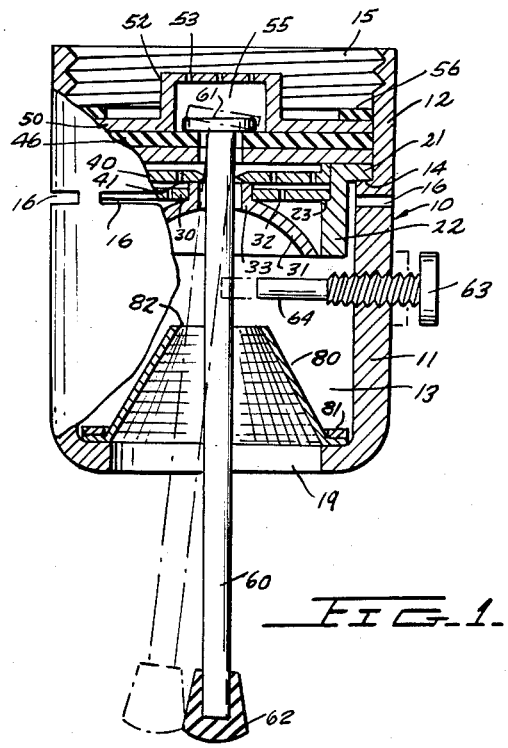
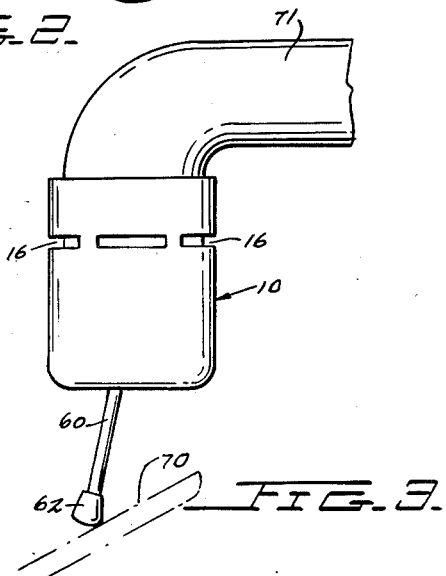
INVENTOR.
ARTHUR DOLAN
BY Greene, Pineles & Durr
ATTORNEYS

United States Patent Office 2,785,881
Patented Mar. 19, 1957

2,785,881

FAUCET ATTACHMENT

Arthur Dolan, Brooklyn, N. Y.

Application July 26, 1954, Serial No. 445,765

2 Claims. (Cl. 261—71)

This invention relates to an air-mixing, valved attachment for water faucets which can be operated by an object to be rinsed.

It is well known that when air is thoroughly dispersed in water, the water air mixture has improved wetting properties which make it more useful in washing and rinsing objects such as dishes, etc.

Among the objects of the invention is to provide an air mixing and rinsing device which may be automatically operated by an object to be rinsed or treated with water so as to leave both hands free to manipulate the said object.

Among other objects of the invention is to provide an improved air mixing attachment for faucets with an improved, pressure operated valve mechanism which is not controlled by a spring mechanism but is held in place by the pressure of the water in the line.

These objects and others ancillary thereto are obtained by providing a tubular casing with a faucet attaching means at one end, an air-water delivery nozzle at the other end, and an intermediate structure adapted to disperse air in the water which intermediate structure comprises two or more orificed plates with a valve seat and valve means therebetween. At least one of the orificed plates is made hat shaped so as to fit over the valve of the device. The valve is moveable in the cup portion of the hat to open and close orifices leading to the air mixing device. The upper orificed plate serves as a metering device to regulate the amount of water admitted to the air mixing device. At least one of the lower orificed plates disperses the water into a number of spray jets which are directed against a dispersal washer which in turn breaks the jets of water into fine particles and provides a thorough mixture of the water with air which is admitted into the casing in the region of the said dispersal washer.

The invention both as to its orgainization and its method of operation together with additional objects and advantages thereof will best be understood from the following description of specific embodiments thereof when read in connection with the accompanying drawing in which:

Fig. 1 is a view partly in cross section of a device made according to the invention.

Fig. 2 is an exploded perspective view of the device of Fig. 1.

Fig. 3 is a view illustrating how the device is operated.

The attachment 10 comprises the housing or casing 11 having an upper portion 12 adapted to be connected to a faucet, and a lower portion 13 which surrounds and forms part of the air mixing chamber. The upper portions 12 and lower portion 13 are separated by an internal shoulder 14 which forms a seat for the interior structure of the device. The upper portion 12 may contain internal threads 15 or equivalent means to hold the device on a faucet. The casing 11 may be formed from soft plastic material such as natural or synthetic rubber or of harder material such as a thermosetting or thermoplastic resin or a metal. The lower portion 13 of housing 11 contains a series of orifices 16 adapted to admit air to the interior of the air mixing chamber.

Inside of the casing 11 is the water dispersing and air mixing means which comprises the ring 20 having an exterior flange 21 adapted to fit on the shoulder 14 and the skirt portion 22. This skirt portion 22 is adapted to extend below the air-admitting openings 16 but is held in spaced relation to the interior wall of the lower portion 13 so as to permit air to enter in the chamber formed by said portion 13. The skirt portion 22 contains a shouldered region 23 adapted to hold the plate 30. The plate 30 contains a plurality of perforations 32 and has the convex washer 31 attached thereto. The convex washer 31 has the central tubular portion 33 by which it is attached to plate 30. Preferably the tubular portion 33 extends above the upper surface of plate 30 to provide spacing means for the perforated plate 40. The plate 44 presses down against outer rim of plate 40 which in turn presses against tubular portion 33 forming a seal against water entering central portion through which rod 60 depends. The perforations 41 in plate 40 serve to divide the stream of water into a number of smaller jets. The rod 60 is adapted to make a close fit with the opening 42 of plate 40 so that the water is forced to pass through openings 41 but the interior edges of the opening 42 in plate 40 are beveled so that the valve actuating rod 60 can pivot or swivel about in said opening.

Above the ring 21 is the metal washer 44 having opening 45. Metal washer 44 provides a solid backing for the relatively soft washer 46. The openings 45 and 47 in washers 44 and 46 respectively are of approximately the same size and are larger in every dimension than the rod 60 in the region where these openings surround said rod 60.

The rod 60 contains a ring valve portion 61 at its upper end which is of larger size than the opening 47 in washer 46 so that when rod 60 is in the position shown in full lines in Fig. 1, the valve is closed. However, it will be noted that rod 60 may be pivoted in any direction or pushed upwardly to open the valve.

Above the washer 40 is the hat shaped metering means 50 having the rim portion 51 and the inverted cup-shaped portion 52. The top of the cup shaped portion contains orifices 53 for metering the water to be passed through the device. The cup shaped portion 52 cooperates with the washer 46 to provide a cylinder-like chamber 55. The chamber serves to provide the pressure to maintain the valve 46—61 in closed position until the actuating member 60 is moved against the pressure of the water in the chamber 55. The rubber or similar washer 56 is provided to form a tight seal between the upper portion 12 of the device and the water faucet. The lower portion of the activating rod 60 is preferably provided with a soft or smooth surfaced tip 62.

The screen 80 is positioned on the flange surrounding the lower opening 19 of housing 11. Screen 80 is frustoconical in shape with the opening 82 at the smaller end. As is illustrated in Fig. 1 the frustoconical shape of the screen 80 permits free pivoting movement of the rod 60. The screen 80 is held in place by washer 81.

In case it is desired to have the water running continuously the screw means 63 is provided. By rotating the means 63 until the plunger 64 pushes rod 60 to the left, as shown in Fig. 1, the valve 46—61 is held in open position.

In operation the device acts as follows: The device is attached to a faucet 71 and the water of said faucet which may be hot or cold as desired is turned on. However, no water is delivered from nozzle opening 19 because the valve 61 is held against washer 46 by the pressure of the water in said faucet.

When the actuating rod 60 is moved, however, water flows through orifices 53, of member 50, opening 47 and 45 of washers 46 and 44 respectively, orifices 41 of plate 40, openings 32 of plate 30. The orifices 32 of plate 30 divide the stream into a plurality of jets and direct these jets against the convex plate 31 whereupon the jets are broken up into small water particles so that said water will thoroughly mix with the air which is admitted through openings 16. As shown in Fig. 3, a plate 70 to be rinsed may be held against actuating rod 60 to open said valve and both hands are free to manipulate the plate 70 or move another object toward the rinsing device.

As will be apparent from Fig. 2 the device is an assembly of a number of parts which are relatively easy to make and simple to assemble. No springs nor other parts that are not automatically fitted in proper position in assembling the device are required.

The features and principles underlying the invention described above in connection with specific exemplifications will suggest to those skilled in the art many other modifications thereof. It is accordingly desired that the appended claims shall not be limited to any specific feature or details thereof.

I claim:

1. In an air-mixing attachment for water faucets of the type which comprises a housing containing means for admitting air to the inside of the housing, means for dividing the water stream into a plurality of fine jets, means for abruptly changing the direction of water in said jets to disperse the water into fine particles said housing including a space wherein said particles of water and the air admitted inside the housing are permitted to mix with each other, the improved construction comprising a soft washer means having a single central opening therein above the water dividing and dispersing means, valve means comprising a valve closure member adapted to close the opening in the said washer from above and an actuating rod extending through the opening in said washer and through said water dividing and dispersing means, said actuating rod being displacable laterally about a pivot region intermediate the ends and adjacent the axis thereof to open said valve closure member said valve means being normally closed by the pressure of water in said faucet.

2. The device as set forth in claim 1 comprising plate-like means between the said soft washer and said dispersing means, said plate-like means having a central-opening adapted to fit closely about said actuating rod, the interior edges of said opening being narrow so as to provide pivoting contact for said rod, said plate-like means containing additional orifices in the region beyond the central orifice to guide the water to the water dividing and dispersing means.

References Cited in the file of this patent

UNITED STATES PATENTS

| | | |
|---|---|---|
| 576,068 | O'Lally | June 26, 1897 |
| 1,267,123 | Schott | May 21, 1918 |
| 1,995,400 | Schultz | Mar. 26, 1935 |
| 2,247,311 | Rockwood | June 24, 1941 |
| 2,510,396 | Goodrie | June 6, 1950 |
| 2,707,624 | Shames et al. | May 3, 1955 |